United States Patent [19]

Dadgar

[11] Patent Number: 4,784,779

[45] Date of Patent: Nov. 15, 1988

[54] CORROSION INHIBITORS FOR CLEAR, CALCIUM-FREE HIGH DENSITY FLUIDS

[75] Inventor: Ahmad Dadgar, Lafayette, Ind.

[73] Assignee: Great Lakes Chemical Corp., West Lafayette, Ind.

[21] Appl. No.: 913,409

[22] Filed: Sep. 30, 1986

[51] Int. Cl.⁴ ...................... E21B 43/00; E21B 41/02; C09K 7/02

[52] U.S. Cl. .............. 252/8.551; 252/8.514; 252/8.555; 252/389.61; 252/389.62

[58] Field of Search ............... 252/8.51, 8.514, 8.551, 252/8.555, 389.61, 389.62

[56] References Cited

U.S. PATENT DOCUMENTS

| | | | |
|---|---|---|---|
| 4,292,183 | 9/1981 | Sanders | 252/8.551 |
| 4,420,406 | 12/1983 | House et al. | 252/363.5 X |
| 4,536,302 | 8/1985 | Augsburger et al. | 252/395 X |
| 4,539,122 | 9/1985 | Son et al. | 252/8.555 X |
| 4,554,081 | 11/1985 | Borchardt et al. | 252/8.551 X |
| 4,609,476 | 9/1986 | Heilweil | 252/8.514 X |
| 4,619,773 | 10/1986 | Heilweil et al. | 252/8.514 |

FOREIGN PATENT DOCUMENTS

| | | | |
|---|---|---|---|
| 2027686 | 2/1980 | United Kingdom | 252/8.555 |
| 2121397 | 12/1983 | United Kingdom | 252/8.555 |

*Primary Examiner*—Herbert B. Guynn
*Attorney, Agent, or Firm*—Kirkland & Ellis

[57] ABSTRACT

The present invention relates to corrosion inhibitors which can be used with calcium-free drilling, completion and workover fluids in carbonate or sulfate containing wells. More particularly, the invention relates to the use of sodium, ammonium and/or calcium thiocyanate alone, or in combination with specific aldose group antioxidants, as corrosion inhibitors. Aldose group antioxidants include arabinose, ascorbic acid, isoascorbic acid, gluconic acid, alkali metal, and alkaline earth or other metal ascorbates, isoascorbates and gluconates and mixtures thereof. Additionally, ammonium thioglycolate may be incorporated as a further corrosion inhibitor.

6 Claims, No Drawings

CORROSION INHIBITORS FOR CLEAR, CALCIUM-FREE HIGH DENSITY FLUIDS

BACKGROUND OF THE INVENTION

1. Field of the Invention

This invention relates to corrosion inhibiting compositions and more particularly to corrosion inhibitors for use in calcium-free brines which may be used in formations having high carbonate and high sulfate concentrations.

2. Description of the Prior Art

Aqueous solutions of alkali and alkaline earth metal and zinc halides, and mixtures thereof, are used as drilling, completion, packer and perforating media in oil and gas wells. Depending on the formation pressures encountered in the well, fluids with densities between 8.5 and 20.0 lb/gal are designed to provide a hydrostatic head to balance the formation pressure. The advent of the so-called solids-free brines in recent years has greatly improved the completion and workover activities by eliminating formation plugging and solid settling problems previously encountered when water base and oil base drilling fluids were used.

There are oil field uses for clear fluids in which subterranean carbonate and sulfate concentrations cause calcium carbonate and calcium sulfate precipitation from the clear fluids which contain significant calcium ion concentration. In some of these instances, sodium bromide fluid has been used in place of calcium ion-containing fluids in relatively shallow holes where high formation pressures are not encountered.

It has been reported by Shaughnessy, et al., "Workover Fluids for Prudhoe Bay", February-July 1977, that the mixing of calcium chloride workover fluid with formation brine can lead to the precipitation of calcium carbonate within the reservoir rock at Prudhoe Bay (P=5000 psi; T=220° F.). To minimize formation damage, a nondamaging fluid, sodium bromide, was used. More recently, carbonate and sulfate containing wells have been found requiring fluid densities well above the sodium bromide range, i.e., 14–20 lb/gal.

U.S. patent application Ser. No. 892,155, filed Jul. 30, 1986, now abandoned, discloses new solids-free brine comprising aqueous solutions of zinc bromide, sodium bromide, potassium bromide, and lithium bromide. According to this disclosure, base fluids of zinc bromide/sodium bromide (density=17.5 lb/gal), zinc bromide/potassium bromide (density=18.0 lb/gal), and zinc bromide/lithium bromide (density=18.0 lb/gal) were prepared by mixing zinc bromide solutions (60–70 wt. %) with the respective monovalent salts (sodium brmide, potassium bromide, or lithium bromide). Different calcium-free fluids covering the density range from 11.5 to 18.0 lb/gal were then formulated by mixing the base fluids with 12.5 lb/gal sodium bromide, 11.3 lb/gal potassium bromide, and 13.4 lb/gal lithium bromide solutions.

Considering the solubility products of calcium carbonate ($3.8 \times 10^{-9}$ at 25° C.), zinc carbonate ($2.1 \times 10^{-11}$ at 25° C.), and calcium sulfate ($2.4 \times 10^{-5}$ at 25° C.), one would expect that zinc carbonate, calcium carbonate, and calcium sulfate should precipitate when zinc bromide/calcium bromide fluids are mixed with formation brine with high carbonate and sulfate ion concentration. The novelty of the calcium-free fluids is that the absence of calcium ion by the substitution of either sodium bromide, potassium bromide or lithium bromide for calcium bromide, lowers the total concentration of divalent metal ions in calcium-free fluids compared with that of standard zinc bromide/calcium bromide fluids such that, when either 17.5 lb/gal zinc bromide/sodium bromide or 18.0 lb/gal zinc bromide/potassium bromide or zinc bromide/lithium bromide are mixed with a 2/8 ratio of formation brine having high carbonate and sulfate ion concentrations, no precipitate will form.

Although solids-free fluids have improved the drilling and completion efficiency, these fluids can be corrosive under operating conditions in drilling, completion, packer and perforating operations. The extent of corrosion is increased at higher temperatures encountered in deeper wells. Any fluid containing zinc halides is more corrosive than those fluids formulated with alkali and alkaline earth metal halides. Therefore it is necessary to use an appropriate corrosion inhibitor when zinc ion is present in the fluid.

In order to minimize the corrosion of iron and steel casing, tubing and the equipment exposed to clear brines, special corrosion additives are combined with the brines before they are used. Corrosion inhibitors such as film-forming amine-based inhibitors are used for calcium-based fluids, and are described in U.S. Pat. No. 4,292,183. According to British patent No. 2,027,686 (Feb. 27, 1983) and German Offen. No. 3,316,677 A1 (Dec. 8, 1983), corrosion inhibitors such as thiocyanate, thioglycolate or thiourea compounds, alone, or in combination with a quaternary pyridinium, quinolium, or isoquinolinium salts may be used in conventional calcium-ion containing concentrated salt solutions, such as zinc bromide, calcium chloride solutions. However, calcium free solutions are significantly more corrosive than zinc bromide/calcium bromide fluids, and conventional inhibitors are not expected to perform satisfactorily in calcium free fluids.

Accordingly, the objective of the present invention is to design corrosion inhibitor systems which can control the corrosion of iron and steel, casing, tubing, and other equipment exposed to high temperature and calcium-free fluids as completion, packer and perforating media. The corrosion inhibitors must be sufficiently soluble in the calcium-free fluids so that they can be formulated in the base fluids.

SUMMARY OF THE INVENTION

The foregoing and other objects, advantages and features of the subject invention may be achieved with a clear, high density calcium-free fluid comprising an aqueous solution of zinc bromide and one or more alkali metal bromides in which is incorporated a corrosion inhibiting amount of sodium, ammonium and/or calcium thiocyanate as a corrosion inhibitor. Optionally, the fluid also contains an effective amount of one or more aldose group antioxidants such as arabinose, ascorbic acid and salts thereof, isoascorbic acid and salts thereof, gluconic acid and salts thereof. Ammonium thioglycolate may also be incorporated in the composition as an additional corrosion inhibitor.

Desirably, the density of the aqueous zinc bromide based solution lies in the range of about 11.5 to 20.5 lbs. per gallon, and the pH of the solution lies in the range of about 1.5 to 5.5. Preferably, the corrosion inhibitor and optional aldose group antioxidant are supplied in the clear fluid at a level of about 0.05–5.00 parts per hundred parts of clear solution.

In its method aspects, the present invention embodys the injection of the foregoing corrosion inhibited calcium-free fluids into oil and gas wells.

DETAILED DESCRIPTION OF THE PREFERRED EMBODIMENTS

Calcium-free fluids formulated from aqueous solutions of zinc bromide and one or more alkali metal bromides such as lithium bromide, sodium bromide, and potassium bromide have utility in oil and gas wells of high carbonate and sulfate ion concentration.

It is believed that primary causes of corrosion in such calcium-free fluids are dissolved oxygen and zinc ion. Because such fluids may have higher zinc ion concentrations than zinc bromide/calcium bromide solutions of corresponding density, dramatic and unexpected increases in corrosion rate have been observed for such calcium-free fluids. In addition, even traces of oxygen in such fluids cause corrosion problems when they are utilized in well completion or workover.

In order for a compound or a chemical system to be used as an inhibitor or an inhibiting system in the well drilling industries, its desirable properties are to (1) dissolve completely in the fluid without leaving any residue, (2) control corrosion at temperatures up to 400° F. or higher, (3) control corrosion for an extended period of at least 30 days, and (4) not interfere with other chemical additives commonly used in the drilling industries.

It has been discovered that sodium, ammonium, and calcium thiocyanates used alone or in combination with aldose group antioxidants may be successfully employed as corrosion inhibitors in calcium-based fluids. Advantageously, ammonium thioglycolate may also be further incorporated as a corrosion inhibitor in such fluids.

Aldose group antioxidants which may be used in accordance with the invention include arabinose, ascorbic acid, isoascorbic acid, gluconic acid, and alkali metal, alkaline earth, or other metal ascorbates, isoascorbates, and gluconates. Preferred aldose group corrosion inhibitors include ascorbic acid, mixtures of ascorbic acid and gluconic acid, and sodium isoascorbate.

The calcium-free fluids in accordance with this invention are described in copending U.S. patent application Ser. No. 892,155, filed Jul. 30, 1986. These fluids are aqueous solutions containing zinc bromide and one or more alkali metal bromides such as sodium bromide, potassium bromide, and lithium bromide. Such fluids desirably have densities lying in the range of 11.5 to 20.5 lbs. per gallon ("ppg"), preferably about 14.5 to 18.0 ppg. Fluids of desired densities within this range may be obtained by blending lighter density fluids with a base fluid such as 18.0 ppg zinc bromide/potassium bromide solution or 17.5 ppg zinc bromide/sodium bromide solution. If densities above the 18.0 or 17.5 ppg of such base fluids are desired, the densities may be increased by mixing additional alkali metal bromides therewith. Preferably, the calcium-free base fluids of this invention comprise at least about 50% by weight zinc bromide. Clear fluids in accordance with this invention are generally useful at pH's lying in the range of about 1.5–5.5. Such fluids may be formulated in the manner described in the foregoing Ser. No. 892,155 application.

The corrosion inhibiting agents may be added to the clear fluids in substantially any convenient manner. Thus, the corrosion inhibitors, including optional aldose group antioxidant where desired, may be added directly to the calcium-free fluid either in solid form or in the form of an aqueous corrosion inhibitor composition. Alternatively, the aldose group antioxidant may be separately added to the calcium-free base solution to provide an inhibited base solution, with the optional aldose group antioxidant thereafter being added to the inhibited base solution, or to a solution of modified density prepared therefrom, in either solid or aqueous solution form immediately prior to use. Other methods of addition may be employed so long as the corrosion inhibiting amount of the corrosion inhibitor is provided in the calcium-free fluid at the time of injection into the oil or gas well.

Desirably, the corrosion inhibitor, including optional aldose group antioxidant, is supplied to the calcium-free fluid at a level of about 0.05–5.00, preferably about 0.5 to 2.0, parts per 100 parts of the calcium-free fluid.

Exemplary corrosion inhibited calcium free high density fluids in accordance with the present invention are shown in the following Examples:

EXAMPLE I

| Constituent | Parts by Weight |
| --- | --- |
| 18.0 ppg Zinc bromide/potassium bromide solution | 99.5 |
| Calcium thiocyanate | .5 |

EXAMPLE II

| Constituent | Parts by Weight |
| --- | --- |
| 17.5 ppg zinc bromide/sodium bromide solution | 99.0 |
| Calcium thiocyanate | 1.0 |

EXAMPLE III

| Constituent | Parts by Weight |
| --- | --- |
| 18.0 ppg zinc bromide/lithium bromide solution | 98.2 |
| Sodium thiocyanate | 0.6 |
| Ammonium thioglycolate | 0.4 |
| Sodium isoascorbate | 0.8 |

EXAMPLE IV

| Constituent | Parts by Weight |
| --- | --- |
| 17.5 ppg zinc bromide/sodium bromide solution | 98.0 |
| Ammonium thiocyanate | 1.0 |
| Ascorbic acid | 0.5 |
| Gluconic acid | 0.5 |

EXAMPLE V

| Constituent | Parts by Weight |
| --- | --- |
| 18.0 ppg zinc bromide/potassium bromide solution | 99.0 |
| sodium thiocyanate | 0.5 |
| sodium isoascorbate | 0.5 |

EXPERIMENTAL EVALUATIONS

The corrosion inhibiting abilities of the fluids of this invention have been evaluated through extensive corrosion tests at temperatures ranging from 300° to 450° F. Coupons of mild steel (AISI 1010), with dimensions 1"×2"×⅛" (0.25" diameter hole for mounting) were obtained from Jack Orr Metal Works in Houston and used without further cleaning. All the corrosion tests for the work of the invention were done in Parr's high pressure cells with about 200 ml of fluids contained in a glass liner to prevent electrical conducting between coupon and the bomb.

Extra care was taken to prevent bubbles forming on the surface of the coupons when being immersed in the fluids. The cells are pressurized with nitrogen or oxygen gas to keep the fluid in a liquid state at the test temperature.

The procedure for the tests is summarized as follows: An oven was set at the appropriate temperature level. (e.g., 200°, 250°, 300°, 350°, 400° or 450° F.). The coupons were washed in acetone and toweled dry. The coupons were weighed to the nearest 0.01 milligram using an analytical balance and suspended from a glass hook supporting post without touching the sides or bottom of the glass liner.

After blending the fluid with inhibitor and/or antioxidant, it was filtered and the density and pH were checked. The fluid was then added to the glass liner. The bomb was pressurized to the appropriate pressure with nitrogen gas by using high pressure regulator. After test period is over, the bomb was allowed to cool for at least an hour to allow the internal pressure to drop.

The coupons were then examined. If necessary, qualitative analysis of adherent scale or foreign material was performed. A few new coupons were weighed and immersed along with the test coupons in a suitable hydrocarbon solvent, such as clean xylene or toluene, long enough to remove the oil, oil wet materials, and paraffins. The coupons were dried in a gentle dry air stream. The coupons were then immersed in an inhibited hydrochloric acid just long enough (usually less than 5 minutes) to remove mineral scale and corrosion product. After cleaning, the coupons were immediately immersed in a saturated solution of sodium bicarbonate for one minute to neutralize the acid. The coupons were rinsed with water, rinsed in isopropyl alcohol or acetone, and dried in a stream of air.

The coupons were then weighed, making sure that weight loss from cleaning is not significant. If the weight loss of the preweighed blank was significant, a correction was made to compensate for the weight loss from cleaning. Any abnormal conditions of the coupons (such as color, pitting, streaking, film coating, or crystal formation) were noted.

Corrosion in mils per year (mpy) was then calculated using the following formula:

$$mpy = \frac{(534)(\text{weight loss})}{(\text{coupon density})(\text{coupon area})(\text{time})}$$

where

-weight loss is in milligrams

-coupon density is in gram/cm$^3$

-coupon area is in inch$^2$

-time is in hours

COMPARATIVE EXAMPLE

According to the disclosure of German Offen. No. 3,316,677 (Dec. 8, 1983), ammonium thioglycolate at a concentration of 0.6 wt. % can control the corrosion rate of mild steel in zinc bromide/calcium bromide fluids. In order to evaluate the effectiveness of this agent in calcium-free fluids, zinc bromide/potassium bromide fluids were prepared by blending 77 wt. % zinc bromide (density=20.3 l/gal) with 38 wt. % potassium bromide (density=11.2 lb/gal). Seven day, 400° F. corrosion rates of mild steel in both uninhibited and inhibited $ZnBr_2/KBr$ were measured. These results, along with corrosion data for $ZnBr_2/CaBr_2$ fluids, are presented in Table I.

The corrosion rate in uninhibited 14.5 lb/gal $ZnBr_2/KBr$ fluid is five times that of the 17.5 lb/gal $ZnBr_2/CaBr_2$ fluid, which contains about the same concentration of $ZnBr_2$. Thus, in addition to zinc ion concentration, the type of second salt ($CaBr_2$ or KBr) greatly influences the corrosion rate. Although ammonium thioglycolate reduces the corrosion rate in 14.5 lb/gal $ZnBr_2/KBr$ somewhat, this reduction is still not good enough to be considered effective. The corrosion data for 16.0 lb/gal $ZnBr_2/KBr$ when compared with those for 18.5 $ZnBr_2/CaBr_2$ are even more pronounced.

TABLE I

Seven Day Corrosion Rates of Mild Steel in $ZnBr_2/KBr$ and $ZnBr_2/CaBr_2$ Fluids at 400° F.

| Density at 70° F. lb/gal | $ZnBr_2$ wt. % | Inhibitor | Corrosion Rate mpy |
|---|---|---|---|
| 14.5 $ZnBr_2/KBr$ | 37.0 | Blank | 339 |
| | 37.0 | 0.6 wt % $NH_4$—TG* | 53 |
| 16.0 | 55.4 | Blank | 675 |
| | 55.4 | 0.6 wt % $NH_4$—TG | 141 |
| 17.5 $ZnBr_2/CaBr_2$ | 39.6 | Blank | 57 |
| | 39.6 | 0.6 wt % $NH_4$—TG | 23 |
| 18.5 | 48.8 | Blank | 90 |
| | 48.8 | 0.6 wt % $NH_4$—TG | 69 |

*$NH_4$—TG = ammonium thioglycolate

EXAMPLE VI

Zinc bromide/potassium bromide base fluid having $ZnBr_2$ concentration similar to that of 19.2 lb/gal $ZnBr_2/CaBr_2$ (i.e., 54 wt. % $ZnBr_2$) was prepared by first diluting the 77 wt. % $ZnBr_2$ with water and then adding dry KBr to have a final composition of 56.2 wt. % $ZnBr_2$ and 17.3 wt. % KBr. Table II presents some corrosion data for mild steel in 18.0 lb/gal $ZnBr_2/KBr$ using different corrosion inhibitors. Although the concentration of $ZnBr_2$ in 18.0 lb/gal $ZnBr_2/KBr$ and 19.2 lb/gal $ZnBr_2/CaBr_2$ fluids is about the same, corrosion rates are much higher in $ZnBr_2/KBr$ fluid. The corrosion rate of mild steel in an uninhibited 19.2 lb/gal $ZnBr_2/CaBr_2$ is 148 mpy, much lower than the value of 610 mpy measured for the uninhibited 18.0 lb/gal.$ZnBr_2/KBr$ fluid.

Although some corrosion protection is obtained using ammonium thioglycolate, calcium thioglycolate and a combination of ammonium thioglycolate and sodium isoascorbate, the seven day corrosion rates (181, 187 and 122 mpy) are far above the acceptable range of 15-30 mpy. The combination of sodium thiocyanate, ammonium thioglycolate, and sodium isoascorbate of the present invention is an excellent corrosion inhibitor system for the 18.0 lb/gal ZnBr$_2$/KBr fluid. The calcium thiocyanate agent of this invention at a concentration of 0.44 wt. % can also effectively reduce the corrosion rate of this fluid. It is believed that in this particular fluid (18.0 lb/gal ZnBr$_2$/KBr), the presence of small concentrations of calcium ion demonstrates a synergistic effect with thiocyanate ion leading to unexpectedly good corrosion inhibition.

TABLE II

Seven Day Corrosion Rates of Mild Steel Coupons in 18.0 lb/gal ZnBr$_2$/KBr Fluid at 300° F.
(56.2 wt. % ZnBr$_2$, 17.3 wt. % KBr)

| Inhibitor | Corrosion Rate (mpy) |
|---|---|
| Blank | 610 |
| 0.6 wt. % NH$_4$—TG* | 181 |
| 0.6 wt. % NH$_4$—TG** 0.4 wt. % Na—IA | 122 |
| 1.0 wt. % Ca—TG*** | 187 |
| 0.44 wt. % Ca(SCN)$_2$ | 20 |
| 0.6 wt. % NH$_4$—TG 0.4 wt. % NaSCN 0.8 wt. % Na—IA | 15 |
| 0.5 wt. % NaSCN | ? |

*Nh$_4$—TG = ammonium thioglycolate
**Na—IA = sodium isoascorbate
***Ca—TG = calcium thioglycolate

EXAMPLE VII

This example involves a 17.0 lb/gal ZnBr$_2$/KBr fluid which, on the basis of ZnBr$_2$ concentration alone, should behave like the 18.5 lb/gal ZnBr$_2$/CaBr$_2$ fluid. Seven day, 350° F. corrosion rate of mild steel in 18.5 lb/gal zinc bromide/calcium bromide fluid inhibited with either 0.6 wt. % ammonium thioglycolate or 0.4 wt. % sodium thiocyanate is 40 mpy. In contrast, as shown in Table III, the corrosion rate in 17.0 lb/gal zinc bromide/potassium bromide fluid inhibited with the same inhibitors is an unacceptably high 73 mpy. Thus, in addition to zinc ion concentration, the nature of the additional salts involved is responsible for the corrosion rate. The addition of 0.2 wt. % sodium isoascorbate to 0.4 wt. % NaSCN increases the corrosion protection somewhat over the sodium thiocyanate inhibition. Increasing both sodium thiocyanate and sodium isoascorbate concentrations (0.6 wt. % NaSCN and 0.6 wt. % Na-IA) increased the corrosion protection to satisfactory levels. Finally, a corrosion inhibitor system comprised of 0.4 wt. % sodium thiocyanate, 0.6 wt. % ammonium thioglycolate, and 0.8 wt. % sodium isoascorbate gives the lowest corrosion rate for mild steel in 17.0 ppg zinc bromide/potassium bromide.

TABLE III

Seven Day Corrosion Rates of Mild Steel Coupons in 17.0 lb/gal ZnBr$_2$/KBr Fluid at 350° F.
(50. - wt. % ZnBr$_2$)

| Inhibitor | Corrosion Rate (mpy) |
|---|---|
| Blank | 350 |
| 1.0 wt. % NH$_4$—TG* | 73 |
| 0.4 wt. % NaSCN | 71 |
| 0.4 wt. % NaSCN 0.2 wt. % Na—IA** | 52 |
| 0.6 wt. % NaSCN 0.6 wt. % Na—IA | 22 |
| 0.6 wt. % NH$_4$—TG 0.4 wt. % NaSCN | 7 |

TABLE III-continued

Seven Day Corrosion Rates of Mild Steel Coupons in 17.0 lb/gal ZnBr$_2$/KBr Fluid at 350° F.
(50. - wt. % ZnBr$_2$)

| Inhibitor | Corrosion Rate (mpy) |
|---|---|
| 0.8 wt. % Na—IA | |

*NH$_4$—TG = ammonium thioglycolate
**Na—IA = sodium isoascorbate

EXAMPLE VIII

Corrosion test results in ZnBr$_2$/NaBr with varying concentrations of ZnBr$_2$ and inhibited with different inhibitors are presented in Table IV. The corrosion results for 17.5 lb/gal fluid (52 wt. % ZnBr$_2$) indicate that for this calcium-free fluid, calcium thiocyanate and a corrosion inhibitor system ("CIS") comprised of 0.4 wt. % sodium thiocyanate. 0.6 wt. % ammonium, thioglycolate, and 0.8 wt. % sodium isoascorbate are the only effective corrosion inhibitor systems. Calcium thioglycolate at 1.0 wt. % concentration reduces the corrosion rate but is not as effective as other inhibitors used. In the case of 14.5 lb/gal ZnBr$_2$/NaBr fluid (25 wt. % ZnBr$_2$), the results indicate that the CIS gives the best corrosion protection. For 18.0 lb/gal ZnBr$_2$/NaBr with a concentration of 61 wt. % ZnBr$_2$, the corrosion inhibitor CIS gives a high level of corrosion protection.

TABLE IV

Seven Day Corrosion Rates of Mild Steel in ZnBr$_2$/NaBr Fluids at 300° F.

| Density at 70° lb/gal | Inhibitor | Corrosion Rate mpy |
|---|---|---|
| 17.5 | Blank | 456 |
| 17.5 | CIS* | 14 |
| 17.5 | 1 wt % Ca—TG** | 126 |
| 17.5 | 0.44 wt % Ca(SCN)$_2$ | 19 |
| 14.5 | Blank | 52 |
| 14.5 | CIS | 8 |
| 18.0 | Blank*** | 710 |
| 18.0 | CIS | 21 |

*CIS = 0.6 wt. % ammonium thioglycolate
0.4 wt % sodium thiocyanate
0.8 wt % sodium isoascorbate
**Ca—TG = calcium thioglycolate
***350° F.

EXAMPLE IX

In order to show the long term effectiveness of the CIS corrosion inhibitor system described above (i.e., 0.4 wt. % sodium thiocyanate, 0.6 wt. % ammonium thioglycolate, and 0.8 wt. % sodium isoascorbate) in calcium-free fluids containing high zinc bromide concentrations, thirty day corrosion tests were performed. The results are presented in Table V. The concentrations of zinc bromide in 17.5 and 18.0 lb/gal ZnBr$_2$/NaBr fluids are 53 wt. % and 61 wt. %, respectively. The 18.5 lb/gal ZnBr$_2$/KBr fluid contains 58 wt. % ZnBr$_2$. The corrosion test results in Table V clearly indicate that even for calcium-free fluids with high concentrations of ZnBr$_2$, the corrosion rate can be satisfactorily controlled by using increased concentrations of corrosion inhibitors.

TABLE V

Thirty Day Corrosion Rates for Mild Steel in Calcium-Free Fluids at 350° F.

| Density at 70° F. lb/gal | Inhibitor | Corrosion Rate mpy |
| --- | --- | --- |
| 17.5 ZnBr$_2$/KBr | Blank | 132 |
| 17.5 ZnBr$_2$/KBr | CIS* | 7 |
| 18.5 ZnBr$_2$/KBr | Blank | 200 |
| 18.5 ZnBr$_2$/KBr | CIS | 16 |
| 18.0 ZnBr$_2$/NaBr | Blank | 166 |
| 18.0 ZnBr$_2$/NaBr | CIS | 8 |

*CIS = 0.6 wt. % ammonium thioglycolate
0.4 wt. % sodium thiocyanate
0.8 wt. % sodium isoascorbate

I claim:

1. A corrosion inhibited clear, high-density fluid for use as a well completion and workover medium comprising:
    a clear aqueous solution of at least about 50 percent zinc bromide by weight of the solution and one or more alkali metal bromides, the solution having a density of about 11.5 to 20.5 pounds per gallon and a pH lying in the range of about 1.5 to 5.5;
    a corrosion inhibiting amount of a corrosion inhibitor selected from the group consisting of sodium, ammonium and calcium thiocyanates and mixtures thereof; and
    an effective amount of an aldose group antioxidant selected from the group consisting of ascorbic acid and salts thereof, gluconic acid and mixtures of ascorbic acid and gluconic acid said high density brine being free of calcium except for that of said calcium thiocyanate where calcium thiocyanate is employed.

2. A corrosion inhibited high density calcium-free fluid, as claimed in claim 1, and further comprising ammonium thioglycolate as an additional corrosion inhibitor.

3. A corrosion inhibited high density calcium-free fluid, as claimed in claim 1, wherein the corrosion inhibitor is calcium thiocyanate.

4. A corrosion inhibited high density calcium-free fluid, as claimed in claim 1, wherein the corrosion inhibitor is a mixture of sodium thiocyanate and ammonium thioglycolate and wherein the antioxidant is sodium isoascorbate or a mixture ascorbic acid and gluconic acid.

5. A method of completion or workover of wells comprising the injection into the well of the corrosion inhibited clear, high density calcium-free fluid of claim 1.

6. A method for inhibiting the corrosion causing potential of clear high density calcium-free fluids useful as well completion and workover media comprising the step of:
    incorporating a corrosion inhibiting amount of a corrosion inhibitor selected from the group consisting of sodium, ammonium and calcium thiocyanates and mixtures thereof and an effective amount of an aldose group antioxidant selected from the group of ascorbic acid and salts thereof, gluconic acid and mixtures of ascorbic acid and gluconic acid to a clear aqueous calcium-free solution of at least about 50 percent zinc bromide by weight of the solution and one or more alkali metal bromides, the solution having a density of about 11.5 to 20.5 pounds per gallon and a pH lying in the range of about 1.5 to 5.5.

* * * * *

UNITED STATES PATENT AND TRADEMARK OFFICE
CERTIFICATE OF CORRECTION

PATENT NO. : 4,784,779

DATED : November 15, 1988

INVENTOR(S) : Ahmad Dadgar

It is certified that error appears in the above-identified patent and that said Letters Patent is hereby corrected as shown below:

Column 1, line 53, "brmide" should be --bromide--

Column 6, line 14, "1/gal" should be --lb/gal--

Column 8, line 20, "thiocyanate." should be --thiocyanate,--

Signed and Sealed this

Second Day of May, 1989

*Attest:*

DONALD J. QUIGG

*Attesting Officer*  *Commissioner of Patents and Trademarks*